(12) United States Patent
Stolle et al.

(10) Patent No.: US 10,369,859 B2
(45) Date of Patent: Aug. 6, 2019

(54) MOTOR VEHICLE CHASSIS

(71) Applicant: HOERBIGER AUTOMOTIVE KOMFORTSYSTEME GMBH, Schongau (DE)

(72) Inventors: Klaus Stolle, Schwabniederhofen (DE); Gerhard Huber, Frankenhofen (DE); Gisela Schleich, Schwabbruck (DE); Jürgen Osterried, Pfronten (DE); Peter Müller, Augsburg (DE)

(73) Assignee: HOERBIGER AUTOMOTIVE KOMFORTSYSTEME GMBH, Schongau (DE)

( * ) Notice: Subject to any disclaimer, the term of this patent is extended or adjusted under 35 U.S.C. 154(b) by 0 days.

(21) Appl. No.: 15/977,044

(22) Filed: May 11, 2018

(65) Prior Publication Data

US 2018/0257451 A1     Sep. 13, 2018

Related U.S. Application Data

(63) Continuation of application No. PCT/EP2016/077146, filed on Nov. 9, 2016.

(30) Foreign Application Priority Data

Nov. 13, 2015   (DE) .................. 10 2015 119 637

(51) Int. Cl.
*B60G 17/027*     (2006.01)
*B60G 15/06*      (2006.01)
(Continued)

(52) U.S. Cl.
CPC ......... *B60G 17/0272* (2013.01); *B60G 15/02* (2013.01); *B60G 15/06* (2013.01);
(Continued)

(58) Field of Classification Search
CPC ............. B60G 17/0272; B60G 15/062; B60G 2202/312; B60G 2202/42; B60G 2500/30; B60G 2202/416
See application file for complete search history.

(56) References Cited

U.S. PATENT DOCUMENTS 5,181,696 A     1/1993  Abe
5,996,978 A *  12/1999  Asanuma ........... B60G 17/0408
                                                188/315

(Continued)

FOREIGN PATENT DOCUMENTS

DE     32 23 195 A1    12/1983
DE     197 44 757 A1    4/1999
(Continued)

OTHER PUBLICATIONS

International Search Report issued by the European Patent Office for corresponding International Patent Application No. PCT/EP2016/077146, dated Jan. 24, 2017, with an English translation.

(Continued)

*Primary Examiner* — Darlene P Condra
(74) *Attorney, Agent, or Firm* — Myers Wolin, LLC

(57) ABSTRACT

In a motor vehicle chassis, at least one wheel suspension, which comprises a spring in the form of a coil spring, has associated therewith a hydraulic height adjustment device having a cylinder-piston arrangement which acts on a base point of the coil spring. The cylinder-piston arrangement can be supplied by a decentral hydraulic aggregate which is associated with the relevant wheel and comprises a storage container for hydraulic fluid and a hydraulic pump driven by an electric motor. At least the electric motor of the hydraulic aggregate is situated within the coil spring.

14 Claims, 2 Drawing Sheets

(51) Int. Cl.
*B60G 15/02* (2006.01)
*B60G 17/015* (2006.01)

(52) U.S. Cl.
CPC ...... *B60G 17/0152* (2013.01); *B60G 2202/12* (2013.01); *B60G 2202/30* (2013.01); *B60G 2202/32* (2013.01); *B60G 2202/413* (2013.01); *B60G 2500/30* (2013.01)

(56) References Cited

U.S. PATENT DOCUMENTS

| | | | | |
|---|---|---|---|---|
| 2008/0111334 | A1* | 5/2008 | Inoue | B60G 17/021 280/124.1 |
| 2009/0108546 | A1 | 4/2009 | Ohletz et al. | |
| 2013/0068550 | A1* | 3/2013 | Gale | B60G 3/145 180/216 |
| 2013/0249183 | A1* | 9/2013 | Ellifson | B60G 13/08 280/124.157 |
| 2014/0306409 | A1 | 10/2014 | Kazmirski et al. | |
| 2014/0312580 | A1* | 10/2014 | Gale | B60G 21/073 280/5.509 |
| 2015/0224845 | A1* | 8/2015 | Anderson | B60G 17/019 701/37 |
| 2016/0059664 | A1* | 3/2016 | Tucker | B60G 17/04 280/124.159 |

FOREIGN PATENT DOCUMENTS

| | | |
|---|---|---|
| DE | 198 55 310 A1 | 6/2000 |
| DE | 10 2005 010 098 A1 | 9/2006 |
| DE | 10 2007 051 299 A1 | 9/2008 |
| DE | 10 2007 051 971 B4 | 9/2010 |
| DE | 10 2009 047 100 A1 | 5/2011 |
| EP | 0 857 871 A1 | 8/1998 |
| EP | 1 236 591 A2 | 9/2002 |
| EP | 2 301 773 A1 | 3/2011 |
| GB | 2 338 689 A | 12/1999 |
| JP | 2010-149550 A | 7/2010 |
| WO | 2011/124513 A1 | 10/2011 |
| WO | 2014/142160 A1 | 9/2014 |
| WO | 2016/180590 A2 | 11/2016 |

OTHER PUBLICATIONS

International Preliminary Report on Patentability, Chapter II of the PCT, for corresponding International Patent Application No. PCT/EP2016/077146 dated Feb. 13, 2018, with an English translation.

\* cited by examiner

MOTOR VEHICLE CHASSIS

CROSS REFERENCE TO RELATED APPLICATIONS

This application is a continuation under 35 U.S.C. § 120 of International Application PCT/EP2016/077146, filed Nov. 9, 2016, which claims priority to German Application No. 10 2015 119 637.9, filed Nov. 13, 2015, the contents of each of which are incorporated by reference herein.

FIELD OF THE INVENTION

The present invention relates to a motor vehicle chassis comprising a basic structure and several wheels connected thereto via one wheel suspension each.

BACKGROUND

In motor vehicle chassis, the wheel suspensions, via which the wheels are connected to the basic structure, are usually a spring as well as a shock absorber. In this context, different possibilities are known as regards the construction of the spring (coil springs, leaf springs, torsion springs) as well as its spatial arrangement relative to the other components of the wheel suspension, especially relative to the associated shock absorber. A variant that is widely used, especially for steerable (front) wheels, is so-called MacPherson struts, in which a shock absorber is disposed within a spring constructed as a coil spring. In contrast, especially for non-steerable (rear) wheels, wheel suspensions in which a shock absorber is disposed outside a spring constructed as a coil spring can be found to a considerable extent.

It is further known that motor vehicles can be equipped with a height-positioning device, in order that, if necessary, the ground clearance can be increased (e.g. for driving onto ramps or the like) or the basic structure can be lowered (e.g. for fuel economy during highway driving). Typically, although not imperatively, this height-positioning device engages in one of the foot points of the spring of the wheel suspension in question and changes this, although in principle it is not decisive whether the spring foot point associated with the basic structure or else with the wheel in question is positioned. Besides pneumatic and electrical spring-foot-point positioning drives (see, for example, DE 102007051971 B4 and DE 102007051299 A1), hydraulic spring-foot-point positioning drives in particular are known, for example from DE 3223195 A1, DE 102009047100 A1, US 5181696 A, EP 2301773 A1, JP 2010-149550 A and WO 2014/142160 A1 as well as from DE 19744757 A1. In this connection, a hydraulic cylinder-piston arrangement associated with the respective wheel suspension is pressurized in controlled manner by a hydraulic aggregate. In the process, and to this extent deviating from the preamble of claim 1, a common central hydraulic aggregate may be provided for several wheel suspensions, as is the case for the motor vehicle chassis disclosed in DE 19744757 A1, for example, or else several decentralized hydraulic aggregates associated with the respective wheel suspension may be provided, which respectively pressurize only one single hydraulic cylinder-piston arrangement.

A motor vehicle chassis of the class in question, corresponding to the preamble of claim 1, is known from DE 102005010098 A1. In this case, a linear actuator, acting on the upper spring foot point and constructed as a cylinder-piston arrangement, is disposed within the spring. This piston is constructed as a hollow piston, within which the motor-pump unit as well as a storage chamber for hydraulic fluid are disposed. The pump of the motor-pump unit then defines, together with the annular end face of the hollow piston, the effective end area of the piston. For pressurization of the hydraulic working chamber constructed in the cylinder at the end upstream from the piston, hydraulic fluid is displaced by means of the motor-pump unit out of the storage container into the working chamber.

In view of the prior art mentioned in the foregoing, the present invention is directed toward providing a motor vehicle chassis of the type mentioned in the introduction, which, as regards the possibility of actively changing the height of the basic structure above the roadway, is characterized by a previously unknown suitability in practice. In particular, the intention is to provide a motor vehicle chassis with an especially compact and nevertheless reliably operating height-positioning device.

SUMMARY

The object, outlined in the foregoing, of the present invention may be achieved by the motor vehicle chassis described herein. Accordingly, the inventive motor vehicle chassis comprising a basic structure and several wheels connected thereto via one wheel suspension each is characterized by the following features cooperating functionally in synergetic manner:

- at least one first wheel suspension is provided with a spring, constructed as a coil spring and associated with the wheel in question, and a shock absorber, associated with the wheel in question and disposed outside the spring;
- a hydraulic height-positioning device with a cylinder-piston arrangement acting on a foot point of the coil spring and comprising a hydraulic working chamber is associated with the first wheel suspension;
- the cylinder-piston arrangement can be pressurized by a decentralized hydraulic aggregate associated with the wheel in question and comprising a storage container for hydraulic fluid and a hydraulic pump driven by an electric motor,
- at least the electric motor of the hydraulic aggregate is disposed within the coil spring;
- the hydraulic working chamber of the hydraulic cylinder-piston arrangement annularly surrounds the electric motor of the hydraulic aggregate and/or its hydraulic pump;
- the hydraulic-fluid storage container is constructed annularly, surrounds the electric motor of the hydraulic aggregate and/or its hydraulic pump, and has a volume that varies inversely relative to the volume of the hydraulic working chamber of the cylinder-piston arrangement.

By the fact that at least the electric motor of the hydraulic aggregate (which is decentralized and pressurizes only the cylinder-piston arrangement of the height-positioning device of the wheel in question) is mounted (at least partly) in the space circumscribed by the coil spring and that the shock absorber associated with the wheel in question is disposed outside the coil spring, a wheel suspension can be obtained that permits height positioning of the motor vehicle chassis and is nevertheless extremely compact. In addition, the coil spring protects the electric motor from damage due to larger extraneous bodies such as stones or the like. Consequently, as far as the dimensioning of its structural parts is concerned, the electric motor of the hydraulic aggregate can be designed for lighter mechanical loads than in the case of an exposed electric motor. Moreover, with clever design of the other components, the inventive arrangement of the electric motor of the hydraulic aggregate may contribute to avoiding longer and/or exposed hydraulic lines between the hydraulic pump—particularly preferably when it is likewise mounted within the coil spring—of the hydraulic aggregate and the cylinder-piston arrangement of the height-positioning device. The absence of exposed hydraulic lines also acts positively on the reliability of the system. And the operating properties of the system benefit from the possibility of particularly short hydraulic lines (due to high stiffness and response speeds).

In this connection, the inventive motor-vehicle chassis is further characterized in that the hydraulic cylinder-piston arrangement comprises an annular working chamber. This surrounds the electric motor of the hydraulic aggregate and/or its hydraulic pump. Particularly preferably, therefore, the annular hydraulic working chamber of the cylinder-piston arrangement is also disposed (at least partly) within the coil spring. In this way, the latter is also able to protect the cylinder-piston arrangement from mechanical damage, which in turn represents an invaluable advantage in terms of reliability of the system.

Furthermore, according to the embodiments disclosed, a likewise annularly constructed hydraulic-fluid storage container is provided, which particularly preferably is (also) disposed within the coil spring. In this connection, each annular hydraulic-fluid storage container has a volume that varies inversely relative to the volume of the hydraulic working chamber of the cylinder-piston arrangement. The latter contributes to the fact that the hydraulic-fluid storage container needs only particularly small installation space. Each installation space is then able to be minimal when the cross-sectional areas of the annular working chamber and of the annular hydraulic-fluid storage container are identical, since in this case no equalizing volume of any kind is needed, because, during actuation of the height-positioning device, the volume of the hydraulic-fluid storage container is reduced by exactly the same extent as that of the hydraulic working chamber and vice versa. The absence of an equalizing volume permits realization of a quite particularly compact system.

A preferred improvement is characterized in that the hydraulic height-positioning device comprises a complex electrohydraulic positioning assembly comprising the hydraulic aggregate and the associated cylinder-piston arrangement, the electric motor of the hydraulic aggregate of which projects in any case at least partly into the coil spring, as explained in the introduction. In a quite particularly preferred improvement, each complex electrohydraulic assembly comprises an adapter, in which the cylinder-piston arrangement is integrated in such a way that no exposed hydraulic lines of any kind exist between the hydraulic pump and the cylinder-piston arrangement. This adapter forms the mechanical interface to the associated coil spring, which is therefore braced on a spring seat, which represents a part of the electrohydraulic positioning assembly.

In keeping with the high degree of complexity, it is further particularly preferred to integrate the pump housing of the associated hydraulic pump in the adapter in such a way that the pump rotor rotates in a cavity constructed in the adapter. This also is one possibility for keeping the necessary installation space particularly small, which in certain combinations is permitted at all only by the inventive partial mounting of the hydraulic aggregate in the space enclosed by the coil spring.

In a preferred improvement, the adapter comprises a base member and an actuating portion, which is guided displaceably thereon and is provided with the spring seat already mentioned hereinabove. Preferably this (annular) hydraulic working chamber —and if applicable also the (annular) hydraulic-fluid storage container—is constructed between a housing portion of the base member and the actuating portion of the adapter in a manner integrated therein. The housing portion, which particularly preferably is joined to the basic structure of the motor vehicle body, is then able, quite particularly preferably, to enclose an adapter core, on the outer circumferential surface of which, i.e. in the separating face between the adapter core and a jacket region of the housing portion surrounding this, hydraulic fluid ducts are constructed. Such an arrangement of fluid ducts (on the upstream side and/or downstream side) permits construction of the pump unit with minimum possible dimensions, which favors disposing the hydraulic pump of the hydraulic aggregate also in the space enclosed by the coil spring.

The adapter core is preferably cylindrically constructed and fixed sealingly in a corresponding cylindrical cavity of the housing portion of the adapter base member. In particular, the adapter core and the housing portion may be permanently joined securely and sealingly with one another by means of a shrink-fit process. By integrating fluid ducts in the separating face of adapter core and housing portion, by the fact that grooves covered by the corresponding inside face of the cavity of the housing section exist on the circumferential face of the adapter core, even hydraulic switches of complex circuitry can be mounted in minimal installation space. This permits particularly compact structures. This in turn is a central aspect for the mounting—provided in some embodiments—of decisive parts of the height-positioning device within the spring, constructed as a coil spring, of the respective wheel-bracing means.

According to yet another preferred embodiment, the hydraulic aggregate is preferably surrounded at least partly by a protective tube. The protection, improved hereby, of the hydraulic aggregate from damage acts in the sense of increased operating safety. In particular, this protective tube may be movable relative to the hydraulic aggregate, for example by the fact that it represents an extension of the actuating portion (mentioned hereinabove).

BRIEF DESCRIPTION OF THE DRAWING

The present invention will be explained in more detail hereinafter on the basis of a preferred exemplary embodiment illustrated in the drawing. This drawing shows only what is needed to understand the present invention and not the other embodiment features—which are sufficiently known—of the motor vehicle chassis in question, i.e. only the height-positioning device of a wheel suspension—respectively in a vertical section—where specifically

DETAILED DESCRIPTION OF THE PREFERRED EMBODIMENTS

Figure 1:
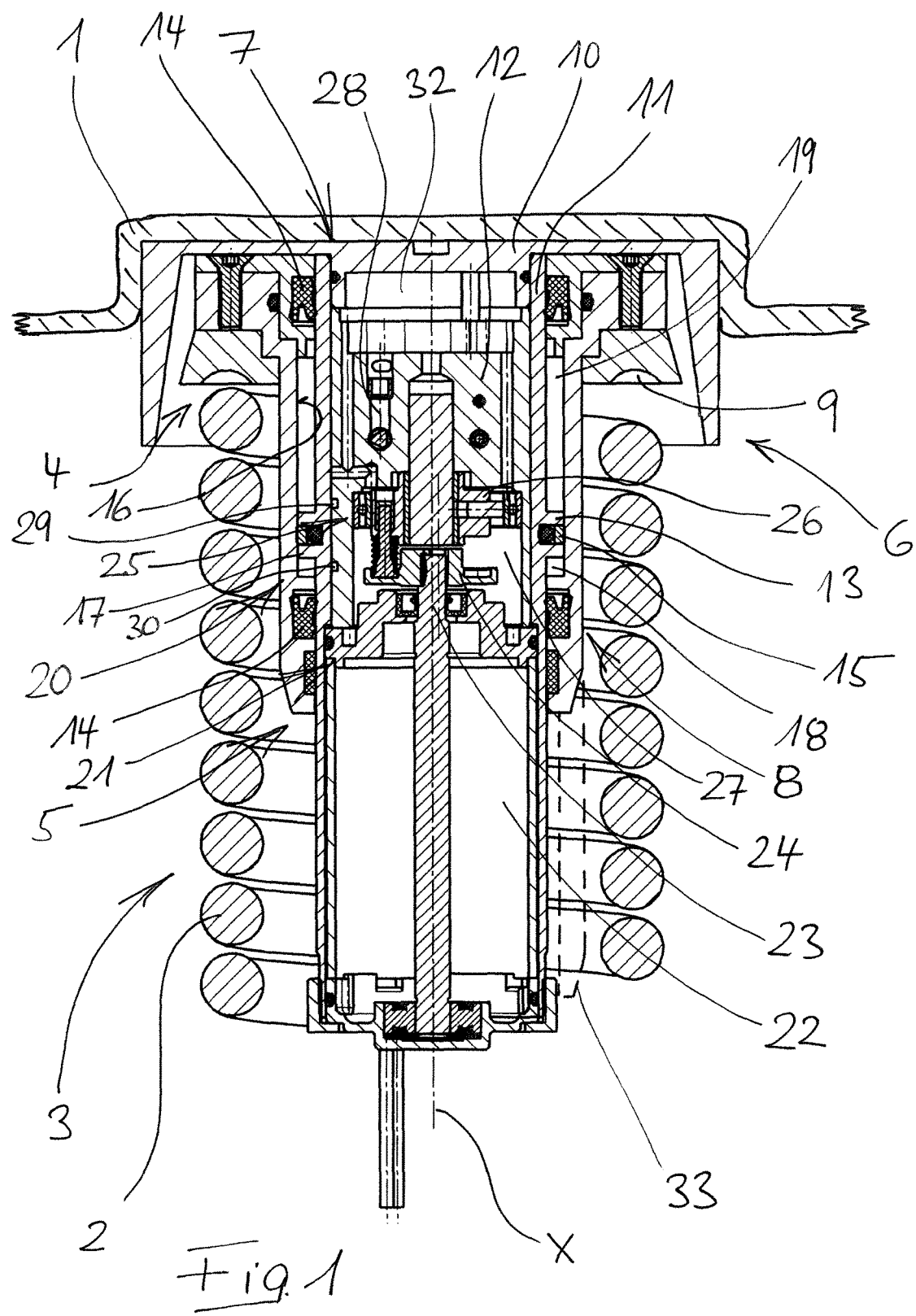
FIG. 1 shows a first configuration, which corresponds to the maximally lowered position of the chassis.
Figure 2:
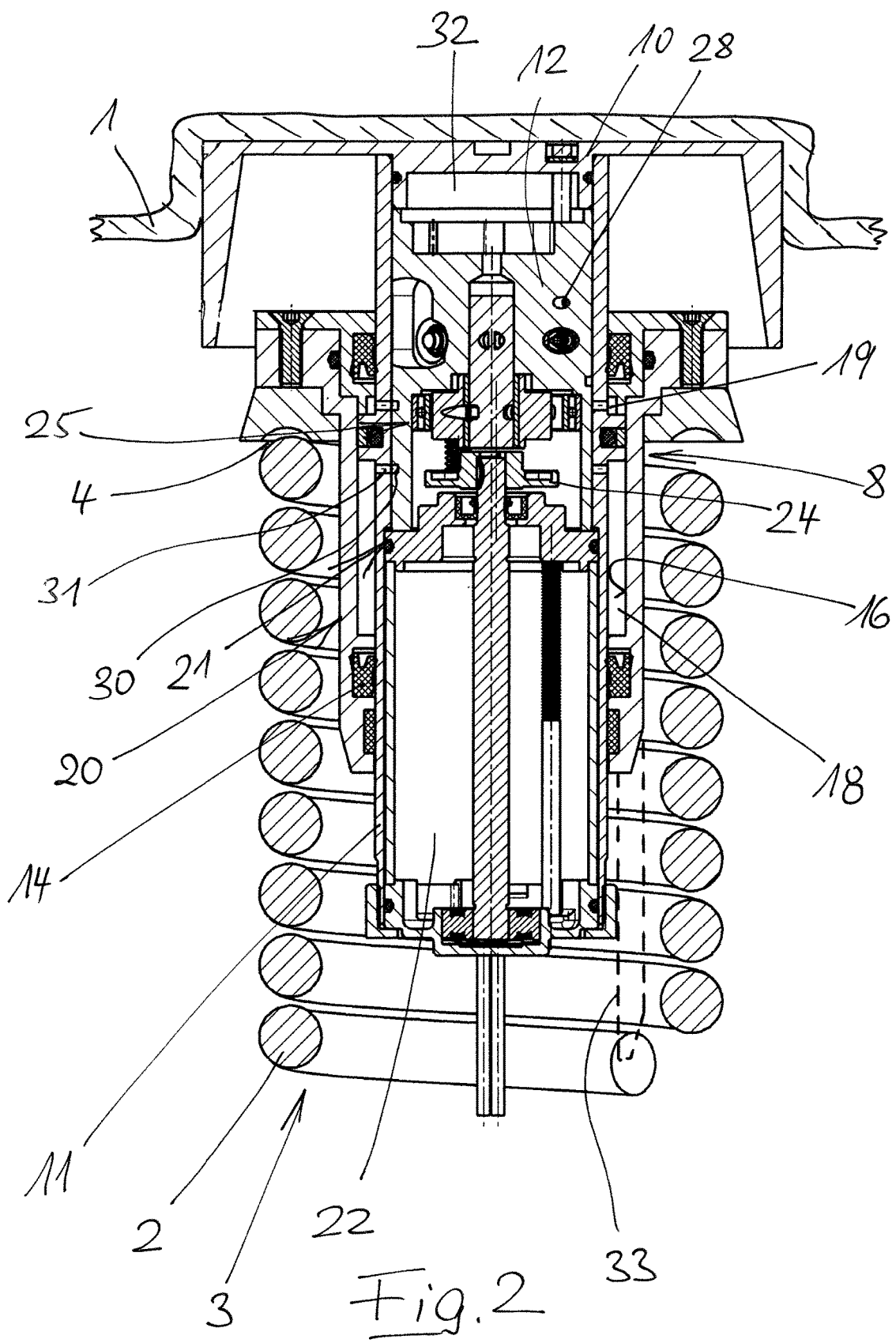
FIG. 2 shows a second configuration, which corresponds to the maximally raised position of the chassis.

The height-positioning device illustrated in the drawing is part of a motor vehicle chassis, which corresponds as such to the generally known prior art (and therefore is not shown), and which comprises a basic structure 1 and several wheels connected thereto via one wheel suspension each. At least that wheel suspension with which the wheel suspension shown in the drawing is associated is provided with a spring 3, constructed as a coil spring 2, and a shock absorber (not shown), disposed outside spring 3.

The shown hydraulic height-positioning device acts in such a way on upper foot point 4 of coil spring 2 that the distance from upper foot point 4 of coil spring 2 to basic structure 1 of the motor vehicle chassis is variable. For this purpose, the hydraulic height-positioning device is constructed as a complex positioning assembly 5. This comprises an adapter 6, which in turn comprises in particular a base member 7 and an actuating portion 8 guided displaceably thereon. Whereas base member 7 of adapter 6 is joined to the basic structure 1 of the chassis, actuating portion 8 is provided with a spring seat 9, on which coil spring 2 is braced in the region of its upper foot point 4.

Base member 7 of adapter 6 comprises, as the main component, a bracing plate 10 serving for joining to basic structure 1, a housing portion 11 and an adapter core 12 received therein. Housing portion 11 is provided with a cylindrical surface subdivided by a shoulder 13 into an upper region and a lower region. Thereon (three-piece) actuating portion 8 is guided displaceably along axis X and specifically is sealed at top and bottom by means of seals 14. Shoulder 13 constructed on housing portion 11 is sealed from cylindrical inside face 16 of actuating portion 8 by means of O-ring 15, which is inserted in a circumferential groove. It represents an annular piston 17, which together with inside surface 16 of actuating portion 8 and the outside surface of housing portion 11 defines, in its lower and its upper region, on the one hand an annular hydraulic working chamber 18 and on the other hand an annular hydraulic-fluid storage container 19. In this sense, the regions, cooperating with one another, of housing portion 11 of adapter 6 on the one hand and of actuating portion 8 on the other hand form a hydraulic cylinder-piston arrangement 20.

Hydraulic aggregate 21 is used for pressurization of hydraulic cylinder-piston arrangement 20 of the hydraulic height-positioning device. This comprises electric motor 22 disposed within housing portion 11 and hydraulic pump 25, which is constructed as a radial piston pump and driven thereby via clutch 24—which is connected to motor shaft 23. The pump housing of hydraulic pump 25 is integrated in adapter 6, by the fact that rotor 26 of the hydraulic pump is mounted in a receiving cavity 27 constructed in adapter core 12. The connection of hydraulic pump 25 to the hydraulic system takes place via hydraulic lines or bores 28 constructed in adapter core 12 as well as via grooves 29, which are made on the surface of adapter core 12 and which, together with the inside face of housing portion 11 surrounding adapter core 12, define hydraulic flow ducts 30. Annular hydraulic working chamber 18 on the one hand and annular hydraulic-fluid storage container 19 on the other hand are connected to these flow ducts 30 via bores 31 passing through housing portion 11.

By the fact that hydraulic-fluid storage container 19 has a volume that varies inversely relative to the volume of hydraulic working chamber 18 of cylinder-piston arrangement 20, wherein—because the end face of annular piston 17 is identical at both ends—the sum of the volumes of hydraulic-fluid storage container 19 and hydraulic working chamber 18 is constant, hydraulic fluid for raising the chassis is conveyed by means of hydraulic pump 25 directly out of annular hydraulic-fluid storage container 19 and directly into hydraulic working chamber 18. For lowering the chassis (solely by means of the weight of the vehicle), a return-flow path is opened between hydraulic working chamber 18 and annular hydraulic-fluid storage container 19. A hydraulic switch suitable for this purpose is subject matter of German Patent 102014018788, for example. The necessary valve system, for example the at least one check valve used for holding the chassis at the adjusted height, is mounted in adapter core 12. Due to the direct flow of hydraulic fluid from annular hydraulic-fluid storage container 19 into annular hydraulic working chamber 18 (and vice versa), an equalizing chamber for hydraulic fluid is not necessary. Space 32 bounded by adapter core 12, housing portion 11 and bracing plate 10 therefore represents on its own a hydraulic-fluid reservoir, from which any leakage that may occur is replaced.

The special arrangement of the parts and components, discussed in the foregoing, of the hydraulic height-positioning device can be inferred directly from the drawing. In particular, it is apparent that electric motor 22 of hydraulic aggregate 21 is disposed inside helical spring 2, as is annular hydraulic working chamber 18, which otherwise—in any case when the chassis is raised—surrounds electric motor 22 of hydraulic aggregate 21. In contrast, annular hydraulic-fluid storage container 19—likewise disposed within coil spring 2—surrounds hydraulic pump 25. It is likewise apparent that, in the shown electrohydraulic positioning assembly, cylinder-piston arrangement 20 is integrated in adapter 6 in such a way that no exposed hydraulic lines of any kind exist between hydraulic pump 25 and cylinder-piston arrangement 20.

Finally, dashed lines (only on one side for reasons of clarity) indicate that actuating portion 8 can be annularly extended downward, whereby a protective tube 33 surrounding hydraulic aggregate 21 is obtained.

What is claimed is:

1. A motor vehicle chassis comprising:
   a basic structure (1) and
   several one wheel suspension assemblies,
   wherein at least a first one wheel suspension assembly is provided with a spring (3), constructed as a coil spring (2),
   wherein furthermore a hydraulic height-positioning device is associated with the first one wheel suspension assembly, with, acting on a foot point (4) of the coil spring (2) and comprising a hydraulic working chamber (18), a cylinder-piston arrangement (20), which can be pressurized by a decentralized hydraulic aggregate (21) comprising a storage container (19) for hydraulic fluid and a hydraulic pump (25) driven by an electric motor (22), wherein at least the electric motor (22) of the hydraulic aggregate (21) is disposed within the coil spring (2),
   wherein the hydraulic working chamber (18) of the hydraulic cylinder-piston arrangement (20) annularly surrounds the electric motor (22) of the hydraulic aggregate (21) and/or its hydraulic pump (25); and
   wherein the hydraulic-fluid storage container (19) is constructed annularly, surrounds the electric motor (22) of the hydraulic aggregate (21) and/or its hydraulic pump (25), and has a volume that varies inversely relative to the volume of the hydraulic working chamber (18) of the cylinder-piston arrangement (20), and wherein the hydraulic working chamber is located below the hydraulic-fluid storage container in the cylinder-piston arrangement.

2. The motor vehicle chassis of claim 1, wherein the hydraulic pump (25) of the hydraulic aggregate (21) is also disposed within the coil spring (2).

3. The motor vehicle chassis of claim 1, wherein the hydraulic-fluid storage container (19) is also disposed within the coil spring (2).

4. The motor vehicle chassis of claim 1, wherein the hydraulic height-positioning device comprises a complex electrohydraulic positioning assembly (5) comprising the hydraulic aggregate (21) and the cylinder-piston arrangement (20).

5. The motor vehicle chassis of claim 4, wherein the electrohydraulic positioning assembly (5) comprises an adapter (6), in which the cylinder-piston arrangement (20) is integrated in such a way that no exposed hydraulic lines of any kind exist between the hydraulic pump (25) and the cylinder-piston arrangement (20).

6. The motor vehicle chassis of claim 5, wherein a pump housing of the hydraulic pump (25) is integrated in the adapter (6) in such a way that a pump rotor (26) rotates in a cavity (27) constructed in the adapter (6).

7. The motor vehicle chassis of claim 5, wherein the adapter (6) comprises a base member (7) and an actuating portion (8), which is guided displaceably thereon and is provided with a spring seat (9).

8. The motor vehicle chassis of claim 7, wherein the base member (7) comprises a housing portion (11) and an adapter core (12) received therein.

9. The motor vehicle chassis of claim 8, wherein hydraulic fluid ducts (30) are constructed in the separating face between the adapter core (12) and the housing portion (11).

10. The motor vehicle chassis of claim 7, wherein the cylinder-piston arrangement (20) comprises an annular working chamber (18) constructed between the base member (7) and the actuating portion (8).

11. The motor vehicle chassis of claim 7, wherein the base member (7) of the adapter (6) is joined to the basic structure (1) of the motor vehicle chassis.

12. The motor vehicle chassis of claim 5, wherein the hydraulic-fluid storage container (19) is integrated in the adapter (6).

13. The motor vehicle chassis of claim 1, wherein the hydraulic aggregate (21) is surrounded at least partly by a protective tube (33).

14. The motor vehicle chassis of claim 13, wherein the protective tube (33) is movable relative to the hydraulic aggregate (21).

* * * * *